United States Patent [19]

Moser et al.

[11] Patent Number: 5,354,341
[45] Date of Patent: Oct. 11, 1994

[54] PROCESS FOR DYEING LEATHER WITH DYE MIXTURES

[75] Inventors: Peter Moser, Binningen; Thomas P. Campbell, Basel; Alois Püntener, Rheinfelden, all of Switzerland

[73] Assignee: Ciba-Geigy Corporation, Ardsley, N.Y.

[21] Appl. No.: 37,194

[22] Filed: Mar. 26, 1993

[30] Foreign Application Priority Data

Apr. 1, 1992 [CH] Switzerland .................. 1053/92

[51] Int. Cl.$^5$ .................. D06P 3/32; C09B 67/00
[52] U.S. Cl. .................. 8/437; 8/436; 8/639; 8/641; 8/643
[58] Field of Search .................. 8/436, 437, 639, 641, 8/643

[56] References Cited

U.S. PATENT DOCUMENTS

| | | | |
|---|---|---|---|
| 3,819,690 | 6/1974 | Bruenisholz | 260/510 |
| 4,309,180 | 1/1982 | Lacroix et al. | 8/436 |
| 4,445,905 | 5/1984 | Schaetzer et al. | 8/641 |
| 4,452,602 | 6/1984 | Püntener et al. | 8/404 |
| 4,537,598 | 8/1985 | Schaetzer et al. | 8/641 |
| 4,652,269 | 3/1987 | Bowles et al. | 8/641 |
| 4,799,933 | 1/1989 | Beffa et al. | 8/436 |
| 5,032,142 | 7/1991 | Egger et al. | 8/549 |
| 5,045,084 | 9/1991 | Walter | 8/639 |
| 5,092,905 | 3/1992 | Doré | 8/639 |

FOREIGN PATENT DOCUMENTS

| | | |
|---|---|---|
| 181292 | 5/1986 | European Pat. Off. . |
| 3326954 | 2/1984 | Fed. Rep. of Germany . |
| 2133803 | 12/1972 | France . |
| 2201329 | 4/1974 | France . |
| 191165 | 5/1937 | Switzerland . |
| 1410862 | 10/1975 | United Kingdom . |
| 2125811 | 3/1984 | United Kingdom . |

OTHER PUBLICATIONS

Chem. Abst. 102: 8244C, 1985.
Textiles vol. 90, 88722d (1979).
The Chemistry of Synthetic dyes K. Venkataraman, vol. I pp. 405–408, 1952.

*Primary Examiner*—Helene Klemanski
*Attorney, Agent, or Firm*—George R. Dohmann; Kevin T. Mansfield

[57] ABSTRACT

Leather is dyed using dye mixtures comprising at least two metal-free dyes each carrying a single sulfo or carboxyl group and having a molecular weight in the range from 450 to 700.

It is preferred to use a trichromatic dyeing formulation comprising at least one yellow dye of formula (1), at least one red dye of formula (2) and at least one blue dye of formula (3) according to claim 2.

Leather is dyed in brilliant shades with these dye mixtures.

26 Claims, No Drawings

PROCESS FOR DYEING LEATHER WITH DYE MIXTURES

The present invention relates to a process for dyeing leather with dye mixtures, especially to a process for dyeing leather by the trichromatic technique, and to the leather dyed by said process.

Processes for dyeing leather with dye mixtures, including the trichromatic technique, are already known in the art and also used with great success. The known dye mixtures, however, have only limited suitability for dyeing in brilliant shades, and it has so far not been possible to dye leather in brilliant shades by the trichromatic technique with the known dye mixtures. Trichromatic dyeing makes special demands of the compatibility of the dyes used in order to ensure a level build-up for obtaining reproducible dyeings of constant shade in different concentrations. Furthermore, these conditions must be met for dyeing leathers of different origin and which have been subjected to different kinds of pretreatment.

The present invention has for its object to provide a process for dyeing leather with dye mixtures, which process makes it possible to dye said leather in brilliant shades. Particularly suitable dye mixtures shall, moreover, make it possible to dye leather in brilliant shades by the trichromatic technique.

This object is accomplished by the inventive process.

Accordingly, the invention relates to a process for dyeing leather with dye mixtures, which comprises using at least two metal-free dyes each carrying a single sulfo or carboxyl group and having a molecular weight in the range from 450 to 700.

A preferred embodiment of the novel process comprises using at least two dyes selected from the group consisting of a) a yellow dye of formula

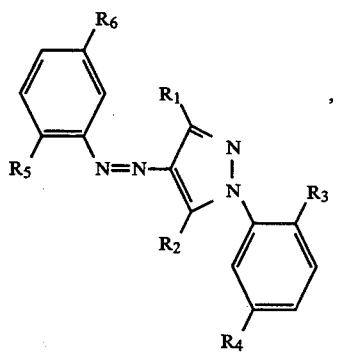
(1)

wherein
$R_1$ is $C_1$–$C_4$alkyl,
$R_2$ is OH or $NH_2$,
$R_3$ is hydrogen or halogen,
$R_4$ is hydrogen or sulfo,
$R_5$ is hydrogen, sulfo or a group

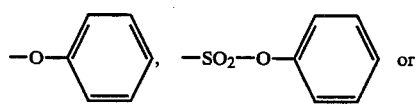
or

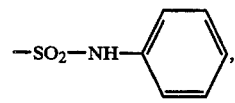

the phenyl rings of which last three mentioned groups may be substituted by halogen, and
$R_6$ is hydrogen, halogen or a group

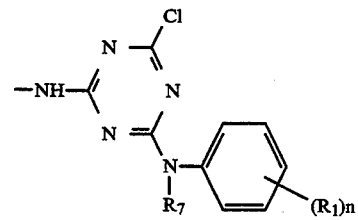

wherein $R_7$ is hydrogen or $C_1$–$C_4$alkyl, $R_1$ is $C_1$–$C_4$alkyl n is 0, 1, 2 or 3, b) a red dye of formula

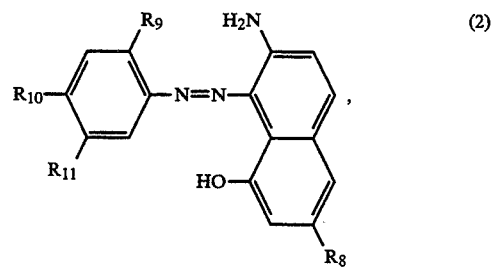
(2)

wherein
$R_8$ is sulfo or

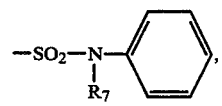

$R_9$ is sulfo,

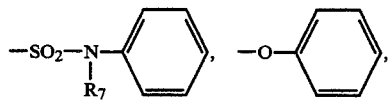

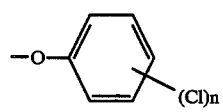

or a group

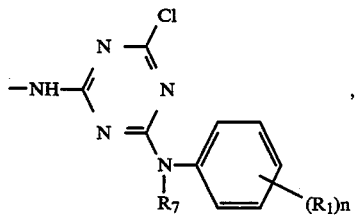

wherein $R_7$ is hydrogen or $C_1$-$C_4$alkyl, $R_1$ is $C_1$-$C_4$alkyl and n is 1, 2 or 3, $R_{10}$ is hydrogen, $C_1$-$C_4$alkylcarbonylamino or halo-$C_1$-$C_4$alkylcarbonylamino, and $R_{11}$ is hydrogen or halogen, and c) a blue dye of formula

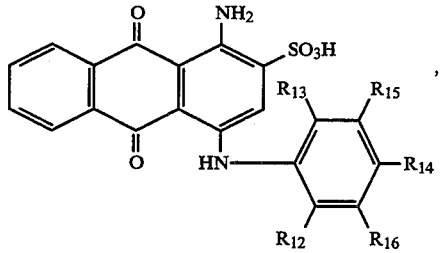

(3)

wherein $R_{12}$, $R_{13}$ and $R_{14}$ are each independently of one another hydrogen or $C_1$-$C_4$alkyl, $R_{15}$ is —$SO_2$—NH—$R_{17}$ or —$CH_2$—NH—CO—$R_{18}$, and $R_{16}$ is hydrogen, $C_1$-$C_4$alkyl or $R_{15}$, and $R_{17}$ is hydroxy-$C_1$-$C_4$alkyl and $R_{18}$ is phenyl or halo-$C_1$-$C_4$alkyl.

The dyes of formulae (1), (2) and (3) each have a single sulfo- or carboxyl group, preferably a single sulfo group.

The alkyl groups may be linear or branched. Hence $C_1$-$C_4$alkyl may be methyl, ethyl, n- or isopropyl as well as n-, iso-, sec- or tert-butyl. The preferred alkyl groups are methyl and ethyl.

Halogen is fluoro, bromo, iodo or, preferably, chloro.

For trichromic dyeing by the novel process it is preferred to use a dye mixture comprising a yellow dye of formula (1), a red dye of formula (2) and a blue dye of formula (3).

In the dyes of formula (1), $R_1$ is preferably methyl. $R_3$ is preferably chloro and $R_4$ is preferably sulfo or hydrogen Preferred meanings of $R_5$ are sulfo or a group

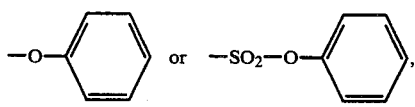

the phenyl rings of which two last mentioned groups are unsubstituted or substituted by chloro.

Preferred meanings of $R_6$ are hydrogen, chloro or a group

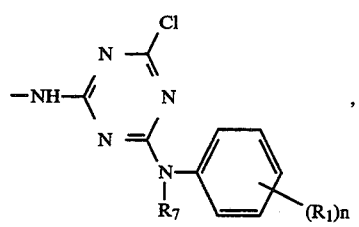

wherein $R_7$ is hydrogen, methyl or ethyl, $R_1$ is methyl and n is 0, 1 or 2.

A particularly preferred embodiment of the novel process comprises using the yellow dye of formula

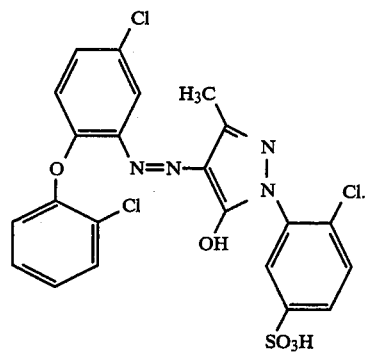

(4)

A further preferred embodiment of the novel process comprises using a red dye of formula (2), wherein $R_8$ is sulfo or

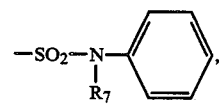

wherein $R_7$ is methyl or ethyl.

It is also preferred to use those dyes of formula (2), wherein $R_9$ is sulfo,

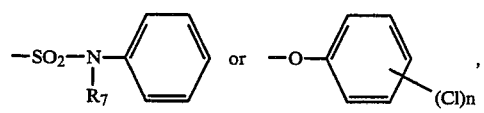

wherein $R_7$ is methyl or ethyl and n is 1.

It is furthermore preferred to use those dyes of formula (2), wherein $R_{10}$ is hydrogen or chloromethylcarbonylamino, as well as those dyes of formula (2), wherein $R_{11}$ is hydrogen or chloro.

A very particularly preferred embodiment of the novel process comprises using the red dye of formula

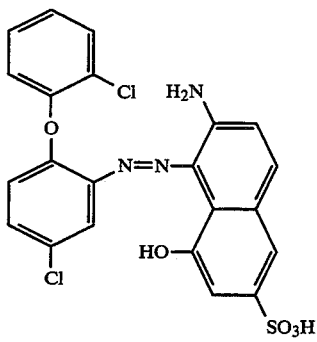

(5)

A further preferred embodiment of the novel process comprises using a blue dye of formula (3), wherein $R_{14}$ is methyl and $R_{12}$ and $R_{13}$ are hydrogen or methyl.

It is furthermore preferred to use those dyes of formula (3), wherein $R_{15}$ is hydrogen, methyl or —$CH_2$—NH—CO—$CH_2$—Cl, as well as those dyes of formula (3), wherein $R_{16}$ is —$SO_2$—NH—$C_2H_4$—OH, —$CH_2$—NH—CO—$CH_2$—Cl or —$CH_2$—NH—CO—$C_6H_5$.

A very especially preferred embodiment of the novel process comprises using the blue dye of formula

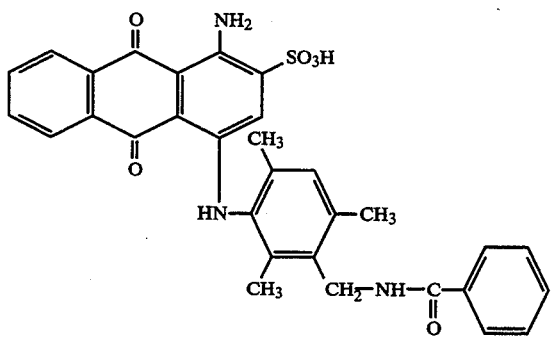

In the novel process it is furthermore preferred to use at least two dyes whose parachor is from 900 to 1200 and whose log P is from 1 to 4. The parachor is calculated in accordance with the article by O. R. Quayle [Chem. Rev. 53 439 (1953)], and log P means the relative lipophily, the calculation of which has been described by C. Hansch et al. [J. Med. Chem. 16, 1207 (1973)].

An especially important embodiment of the novel process comprises using for trichromatic dyeing a mixture consisting of the yellow dye of formula (4), the red dye of formula (5) and the blue dye of formula (6).

In addition to the dyes of formulae (2), (3) or (4), it is possible to use further dyes in the novel dyeing process. This can be expedient, e.g., if the shades are desired to be duller or darker or to have a somewhat different colour hue, relative to those which can be obtained with the specified dyestuffs. As additional dyes it is preferred to use those dyes that likewise contain a sulfo or carboxyl group and have a molecular weight in the range from 450 to 700.

Owing to the good compatibility with the dyes of formulae (2), (3) or (4), it is especially preferred to use a black dye of formula

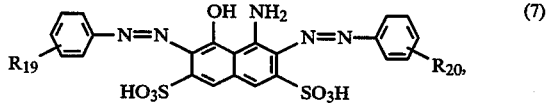

wherein $R_{19}$ is hydrogen, $C_1$-$C_4$alkyl, $C_1$-$C_4$alkoxy or $C_1$-$C_4$alkanoylamino and $R_{20}$ is chloro or nitro, or a brown dye of formula

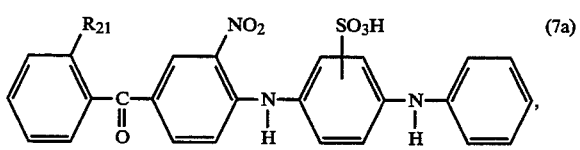

wherein $R_{21}$ is —COOH, —CONH$_2$, —SO$_3$H or —SO$_3$NH$_2$.

As additional black dye it is preferred to use the black dye of formula

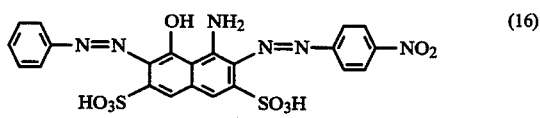

and, as additional brown dye, it is preferred to use the brown dye of formula

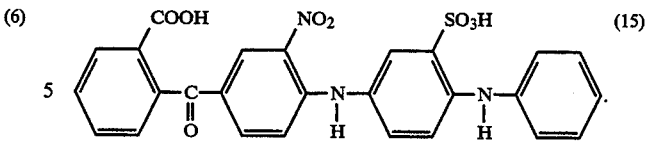

The dyes used in the practice of this invention are anionic dyes and are conveniently used in the form of their salts, preferably alkali metal salts or ammonium salts. Particularly suitable alkali metal salts are lithium, potassium or sodium salts, and ammonium salts will also be understood as meaning salts of organic amines, typically those that are substituted by $C_1$-$C_6$alkyl or hydroxy-$C_1$-$C_6$alkyl groups.

The dyes used in the novel process are known or can be prepared in per se known manner.

The amounts in which the dyes eligible for use in the practice of this invention are used can vary over a wide range, depending on the desired depth of shade. Normally amounts of 0.1 to 10% by weight, preferably of 0.5 to 4% by weight, will be used, based on the weight of the leather to be dyed.

In addition to containing water and the dyes, the dye liquor may contain further ingredients, typically acids, bases or salts for adjusting the desired pH, as well as auxiliaries such as wetting agents, fatliquoring agents, color intensifiers, levelling agents, penetraters and/or antifoams.

The novel process has the great advantage that it is suitable not only for one type of leather, but for different types of leather, for example chrome leather, re-tanned leather or suede leather made from goatskin, cow-hide or pigskin.

Dyeing is preferably carried out by the exhaust process, conveniently at a liquor to goods ratio of 1:1.5 to 1:20, preferably of 1:2 to 1:10, and in the temperature range from 20° to 100° C., preferably from 30° to 60° C. If desired or necessary, the leather can be subjected to a pretreatment, conveniently neutralization or dressing.

The dyeing time will vary, depending on the type of leather and on the desired depth of shade, but is normally from 30 to 180 minutes. After dyeing, the leather is rinsed and finished in conventional manner, The dyeings obtained on leather by the novel process are brilliant in shade and have good fastness properties, for example light- and wetfastness. As the individual dyes penetrate the leather to about the same depth, the shade on the surface and in deeper layers of the leather is identical.

For dyeing, the individual dyes are mixed with one another. They may be prepared individually as stock solutions for the dyeing process or formulated together to a single stock solution.

The invention further relates to formulations for trichromatic dyeing comprising at least one yellow dye of formula (1), at least one red dye of formula (2) and at least one blue dye of formula (3).

Preferred formulations for trichromatic dyeing comprise 1 to 98% by weight of a yellow dye of formula (1), 1 to 98% by weight of a red dye of formula (2), and 1 to 98% by weight of a blue dye of formula (3), preferably 10 to 70% by weight of a yellow dye of formula (1), 10 to 50% by weight of a red dye of formula (2), and 10 to 50% by weight of a blue dye of formula (3).

The invention is illustrated by the following non-limitative Examples in which parts and percentages are by weight. The dyes are used in commercial powder or liquid form.

EXAMPLE 1

100 parts of chrome-tanned side leather (shaved weight) are washed for 15 minutes in 300 parts of water at 30° C. and then neutralized for 60 minutes at 30° C. in a liquor consisting of 300 parts of water, 2 parts of a neutralizing agent (sodium salts of aromatic sulfonic acids and aliphatic dicarboxylic acids) and 0.5 part of sodium hydrogencarbonate. The leather is afterwards washed for 15 minutes in 300 parts of water at room temperature.

The treated leather is then dyed for 30 minutes at 50° C. in a freshly prepared bath consisting of 300 parts of water and 2.46 parts of the dye mixture comprising 1.88 parts of the yellow dye of formula

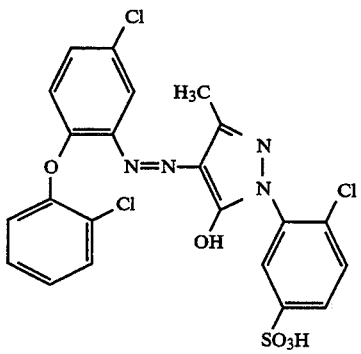
(4)

and 0.58 part of the blue dye of formula

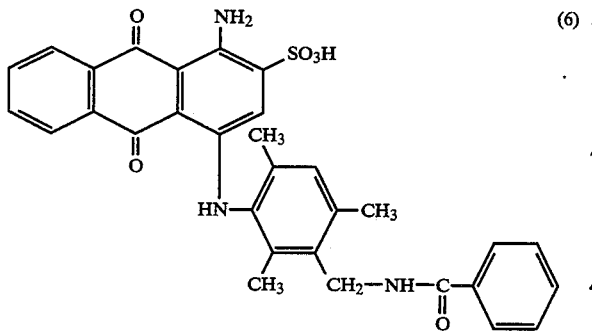
(6)

To the dye liquor are then added 3 parts of a synthetic fatliquoring agent (formulation based on sulfonated aliphatic hydrocarbons, fatty acids and derivatives thereof), followed 30 minutes later by the addition of 0.5 part of 85% formic acid. Dyeing is continued for a further 30 minutes at the same temperature. The dyed leather is then rinsed and finished in conventional manner.

The leather is dyed in a pure, level green shade of good fastness properties. The compatibility of the dyes used is especially good. By lightly buffing of the surface of the leather it is observed that both dyes have penetrated the leather to the same depth.

EXAMPLE 2

100 parts of chrome side leather (shaved weight) are neutralized in accordance with the particulars of Example 1 and then treated for a further 60 minutes at 30° C. in the same liquor with 7 parts of a liquid synthetic retanning agent (condensates of polyphenolic sulfonic acids with formaldehyde and urea). The leather is afterwards washed for 15 minutes in 300 parts of water at room temperature. This retanned chrome side leather is then dyed at 50° C. in a liquor consisting of 300 parts of water and 4.92 parts of the dye mixture used in Example 1. After a dyeing time of 30 minutes, 3 parts of the synthetic fatliquoring agent of Example 1 are added, followed 30 minutes later by the addition of 1 part of 85% formic acid. After this acidification, the treatment is continued for 30 minutes at 50° C. The dyed leather is then rinsed in cold water and finished. The green dyeing obtained has good fastness properties and a pure shade. The compatibility of the dyes on this leather is also very good as is tested as described in Example 1. In addition, the shade of the dyeing substantially matches that obtained on non-retanned chrome side leather with the same dye formulation by the procedure described in Example 1.

EXAMPLE 3

The procedure described in Example 2 is repeated, but replacing the retanning agent used therein with 3 parts of a strongly anionic retanning agent (condensate of formaldehyde with phenolic sulfonic acids) to give leather having a very anionic surface. The dyeing obtained substantially matches that obtained on non-retanned chrome side leather in Example 1 and that obtained on retanned chrome side leather in Example 2.

EXAMPLE 4

The procedure described in Example 1 is repeated, but replacing the dye mixture used therein with 1.88 parts of a dye mixture comprising 0.92 part of the yellow dye of formula (4), 0.50 part of the blue dye of formula (6) and 0.46 part of the red dye of formula

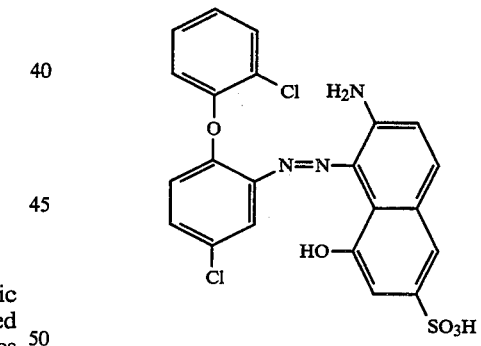
(5)

to give a leather dyed in a reddish-brown shade.

The compatibility of the dyes is very good. By buffing the leather surface it is observed that all dyes penetrate the leather to the same depth.

EXAMPLE 5

The procedure of Example 2 is repeated, but replacing the dye mixture used therein with 3.76 parts of the dye mixture of Example 4 to give a dyeing that matches in shade that obtained on non-retanned chrome side leather by the procedure described in Example 4.

EXAMPLE 6

100 parts of chrome side leather (shaved weight) are neutralized and retanned in accordance with the particulars described in Example 2 and afterwards dyed for 30 minutes at 50° C. in a liquor comprising 300 parts of water, 2.5 parts of the dye of formula (4) and 0.8 part of the dye of formula (6). After 30 minutes, 3 parts of the synthetic fatliquoring agent of Example 1 are added, followed 30 minutes later by the addition of 1 part of 85% formic acid. After this acidification, the treatment is continued for 30 minutes at 50° C.

The leather is then subjected to an aftertreatment in a fresh bath with 1 part of a color intensifier (polyquaternary adduct of an amine and ethylene oxide) in 300 parts of water. After a treatment time of 15 minutes, half the amount of the above dyes is added and dyeing is continued for 15 minutes at 50° C. Then 0.25 part of 85% formic acid is added. Dyeing is complete after a further 20 minutes. The dyed leather is then rinsed in cold water.

The dyeing is finished in conventional manner and has good fastness properties and a full, pure green shade. It is substantially fuller and stronger than a corresponding dyeing obtained without the colour intensifier. Comparable results are also obtained with the other mixtures of dyes of formulae (4), (5) and (6).

EXAMPLE 7

100 parts of chrome-tanned garment suede leather (dry weight) are wet back for 60 minutes at 50° C. in a solution of 1000 parts of water and 2 parts of 24% ammonia. The leather is afterwards washed for 15 minutes in 1000 parts of water of 50° C.

After these preparatory operations, the leather is dyed at 50° C. in a liquor comprising 1000 parts of water, 2 parts of 24% ammonia and 19.68 parts of the dye mixture used in Example 1.

After a dyeing time of 60 minutes, the dye liquor is acidified with 4 parts of 85% formic acid and dyeing is subsequently continued for a further 20 minutes.

The dyed leather is finished after a treatment for 45 minutes at 50° C. in a fresh bath comprising 1000 parts of water, 2.5 parts of a condensate of formaldehyde, dicyandiamide, ammonium chloride and ethylenediamine, as well as 0.5 part of 85% formic acid. The leather is dyed in a pure green shade of good fastness properties and good formic acid. The leather is dyed in a pure green shade of good fastness properties and good covering properties.

EXAMPLE 8

100 parts of chrome velvet split (dry weight) are wetted back for 60 minutes at 50° C. in 1000 parts of water and 2 parts of 24% ammonia and afterwards washed for 15 minutes with 1000 parts of water of 50° C.

The so prepared leather is then dyed at 50° C. in a fresh liquor consisting of 1000 parts of water, 2 parts of 24% ammonia and 9.84 parts of the dye mixture used in Example 1. After 60 minutes, 4 parts of 85% formic acid are added and dyeing is continued for 20 minutes at this temperature.

The dyed leather is rinsed in cold water and finished. The leather is dyed in a pure green shade of good fastness properties and is distinguished by uniformity of shade between the suede and flesh side.

EXAMPLE 9

The procedure of Example 1 is repeated, but replacing the dye mixture used therein with 1.38 parts of a dye mixture comprising 0.5 part of the yellow dye of formula

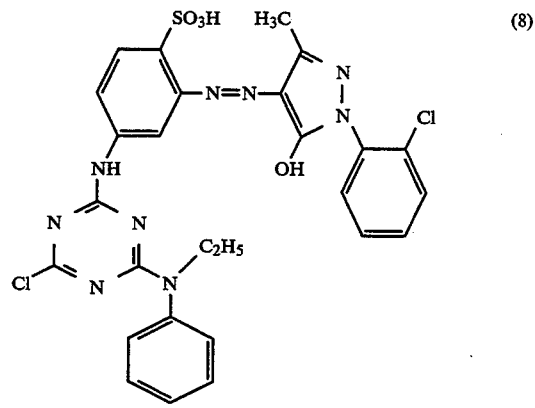

and 0.88 part of the blue dye of formula (6) to give leather which is dyed in a strong medium green shade.

EXAMPLE 10

The procedure of Example 2 is repeated, but replacing the dye mixture used therein with 2.76 parts of the dye mixture used in Example 9 to give a dyeing that also matches in shade the dyeing obtained on non-retanned chrome side leather in Example 9.

EXAMPLE 11

The procedure described in Example 1 is repeated, but replacing the dye mixture used therein with 1.5 parts of a dye mixture comprising 0.5 part of the yellow dye of formula (8) as indicated in Example 9 and 1.0 part of the blue dye of formula

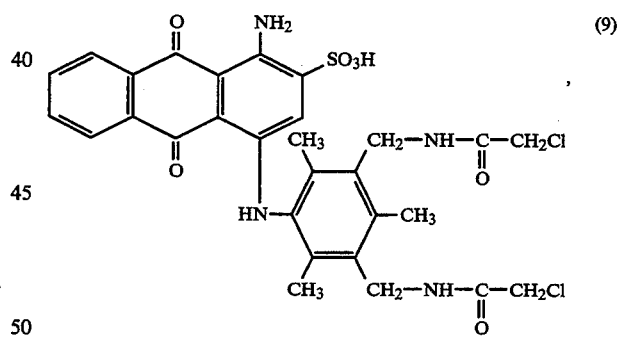

to give leather which is dyed in a strong green shade.

EXAMPLE 12

The procedure described in Example 2 is repeated, but replacing the dye mixture used therein with 3.00 parts of the dye mixture used in Example 11 to give a dyeing that matches in shade the dyeing obtained on non-retanned chrome side leather in Example 11.

EXAMPLE 13

The procedure described in Example 1 is repeated, but replacing the dye mixture used therein with 2.4 parts of a dye mixture comprising 1.4 parts of the yellow dye of formula (4) as indicated in Example 1 and 1.0 part of the blue dye of formula

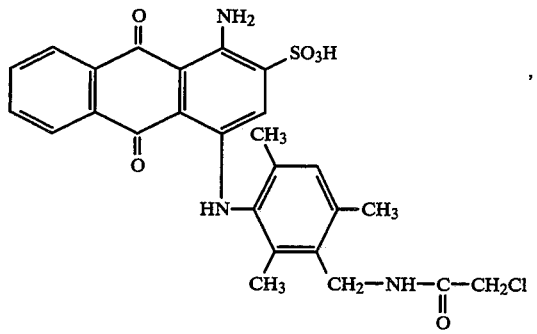

to give leather which is dyed in a strong green shade.

EXAMPLE 14

The procedure described in Example 1 is repeated, but replacing the dye mixture used therein with 1.6 parts of a dye mixture comprising 0.6 part of the red dye of formula

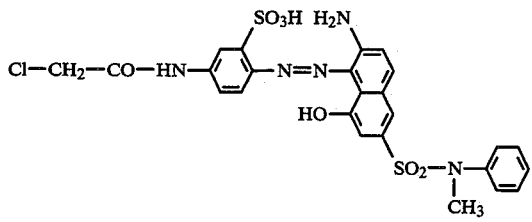

and 1.0 part of the blue dye of formula (9) as indicated in Example 11 to give leather which is dyed in a strong violet shade.

EXAMPLE 15

The procedure described in Example 2 is repeated, but replacing the dye mixture used therein with 3.20 parts of the dye mixture of Example 14 to give a dyeing which matches in shade the dyeing obtained on non-retanned chrome side leather in Example 14.

EXAMPLE 16

The procedure described in Example 1 is repeated, but replacing the dye mixture used therein with 2.4 parts of a dye mixture comprising 1.4 parts of the yellow dye of formula (4) as indicated in Example 1 and 1.0 part of the blue dye of formula

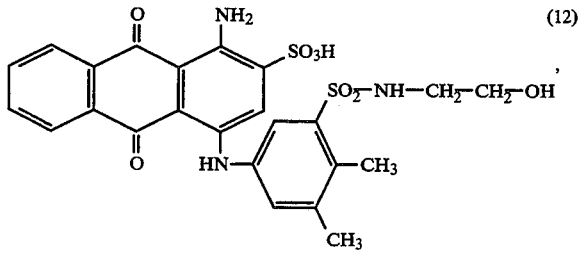

to give leather which is dyed in a strong green shade.

EXAMPLE 17

The procedure described in Example 1 is repeated, but replacing the dye mixture used therein with 2.7 parts of a dye mixture comprising 1.4 parts of the yellow dye of formula (4) as indicated in Example 1 and 1.3 parts of the red dye of formula

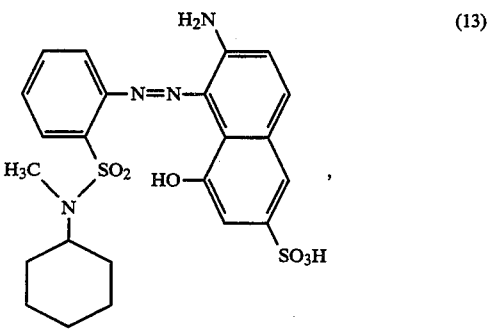

to give leather which is dyed in a strong orange shade.

EXAMPLE 18

The procedure described in Example 1 is repeated, but replacing the dye mixture used therein with 2.08 parts of a dye mixture comprising 1.2 parts of the yellow dye of formula

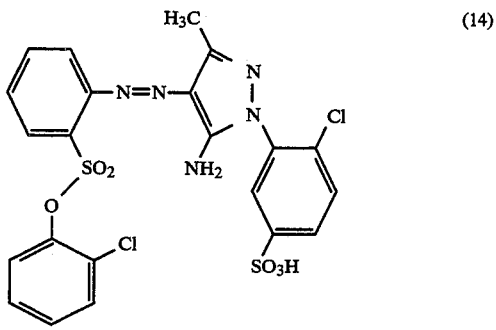

and 0.88 part of the blue dye of formula (6) as indicated in Example (1) to give leather which is dyed in a strong green shade.

EXAMPLES 19 to 36

By following the procedures described in Examples 1, 2 and 4, and using the yellow dye of formula (4), the red dye of formula (5) and the blue dye of formula (6) in the respective amounts (parts) indicated below, dyeings in the stated shades are obtained on leather.

| Example | Dye (4) | Dye (5) | Dye (6) | Shade |
|---|---|---|---|---|
| 19 | 1.68 | 0.12 | 0.53 | greenish brown |
| 20 | 1.4 | 0.31 | 0.44 | reddish brown |
| 21 | 1.20 | 0.17 | 0.76 | greenish grey |
| 22 | 0.84 | 0.74 | 0.18 | bordeaux |
| 23 | 0.90 | 0.42 | 0.6 | brown |
| 24 | 1.2 | 0.17 | 0.76 | dark green |
| 25 | 0.7 | 0.62 | 0.44 | bordeaux |
| 26 | 0.7 | 0.31 | 0.88 | dull violet |
| 27 | 0.42 | 0.87 | 0.26 | bordeaux |
| 28 | 0.28 | 0.74 | 0.53 | blueish bordeaux |
| 29 | 1.8 | 0.42 | — | reddish orange |
| 30 | 1.4 | 0.62 | — | scarlet red |
| 31 | 0.92 | 0.82 | — | neutral red |
| 32 | — | 0.42 | 1.18 | violet |
| 33 | — | 0.62 | 0.88 | reddish violet |
| 34 | — | 0.82 | 0.58 | blueish bordeaux |
| 35 | 0.92 | — | 1.18 | blueish green |
| 36 | 1.40 | — | 0.88 | green |

EXAMPLE 37

By following the procedures described in Examples 1 to 4, and using 0.62 part of the red dye of formula (5), 0.18 part of the blue dye of formula (6) and 1.0 part of the black dye of formula

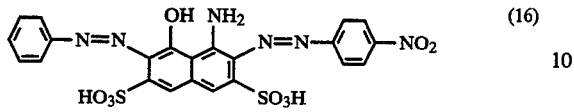 (16)

a dyeing in a covered violet shade is obtained on leather.

EXAMPLE 38

By following the procedures described in Examples 1 to 4, and using 0.23 part of the yellow dye of formula (4), 0.27 part of the red dye of formula (5) and 1.2 parts of the brown dye of formula

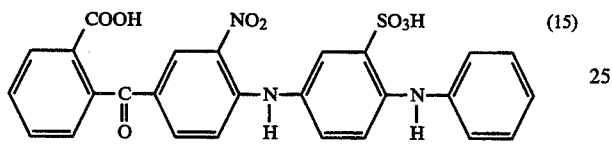 (15)

an orange brown dyeing is obtained on leather.

What is claimed is:

1. A process for dyeing leather, which comprises applying a dye mixture to the leather wherein the dye mixture comprises at least two dyes selected from the group consisting of a) a yellow dye of formula

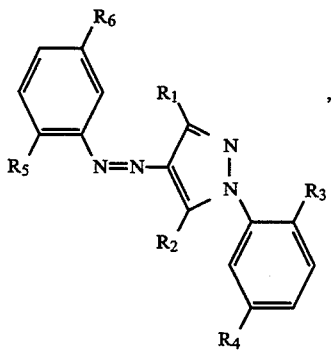 (1)

wherein
$R_1$ is $C_1$-$C_4$alkyl,
$R_2$ is OH or $NH_2$,
$R_3$ is hydrogen or halogen,
$R_4$ is hydrogen or sulfo,
$R_5$ is hydrogen, halogen, sulfo or a group

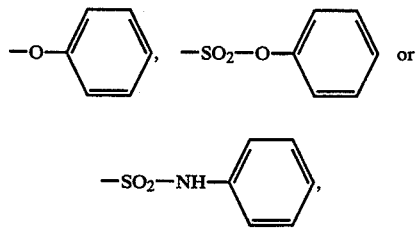

the phenyl rings of which last three mentioned groups may be substituted by halogen, and
$R_6$ is hydrogen, halogen or a group

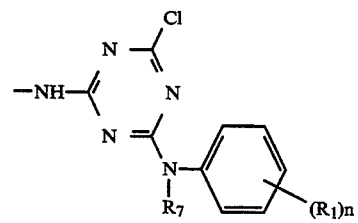

wherein $R_7$ is hydrogen or $C_1$-$C_4$alkyl, $R_1$ is $C_1$-$C_4$alkyl and n is 0, 1, 2 or 3, b) a red dye of formula

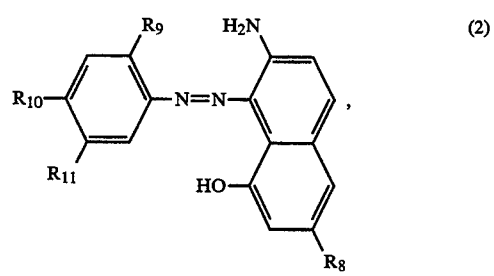 (2)

wherein
$R_8$ is sulfo or

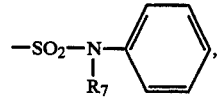, $R_9$ is sulfo,

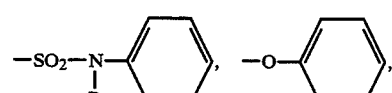

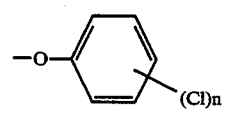

or a group

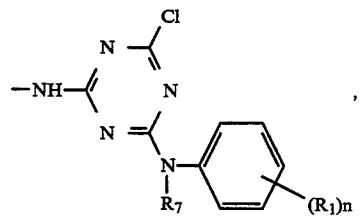, wherein $R_7$ is hydrogen or $C_1$-$C_4$alkyl, $R_1$ is $C_1$-$C_4$alkyl and n is 1, 2 or 3, $R_{10}$ is hydrogen, $C_1$-$C_4$alkylcarbonylamino or halo-$C_1$-$C_4$alkylcarbonylamino, and $R_{11}$ is hydrogen or halogen, and c) a blue dye of formula

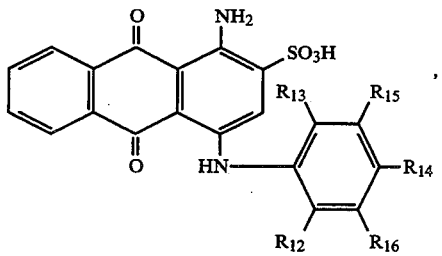
(3)

wherein $R_{12}$, $R_{13}$ and $R_{14}$ are each independently of one another hydrogen or $C_1$-$C_4$alkyl, $R_{15}$ is hydrogen, methyl, —$SO_2$—NH—$R_{17}$ or —$CH_2$—NH—CO—$R_{18}$, and $R_{16}$ is hydrogen, $C_1$-$C_4$alkyl or $R_{15}$, and $R_{17}$ is hydroxy-$C_1$-$C_4$alkyl and $R_{18}$ is phenyl or halo-$C_1$-$C_4$alkyl.

2. A process according to claim 1, wherein the dye mixture is a trichromatic mixture consisting of a yellow dye of formula (1), a red dye of formula (2) and a blue dye of formula (3).

3. A process according to claim 1, which comprises using a yellow dye of formula (1), wherein $R_1$ is methyl.

4. A process according to claim 1, which comprises using a yellow dye of formula (1), wherein $R_3$ is chloro.

5. A process according to claim 1, which comprises using a yellow dye of formula (1), wherein $R_4$ is sulfo or hydrogen.

6. A process according to claim 1, which comprises using a yellow dye of formula (1), wherein $R_5$ is sulfo or a group

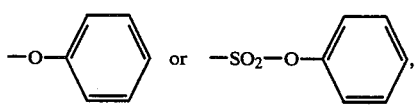

the phenyl rings of which two last mentioned groups are unsubstituted or substituted by chloro.

7. A process according to claim 1, which comprises using a yellow dye of formula (1), wherein $R_6$ is hydrogen, chloro or a group

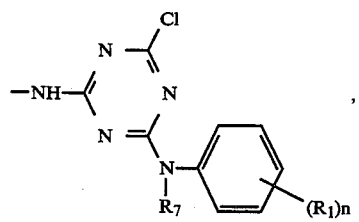

wherein $R_7$ is hydrogen, methyl or ethyl, $R_1$ is methyl and n is 0, 1 or 2.

8. A process according to claim 1, which comprises using the yellow dye of formula

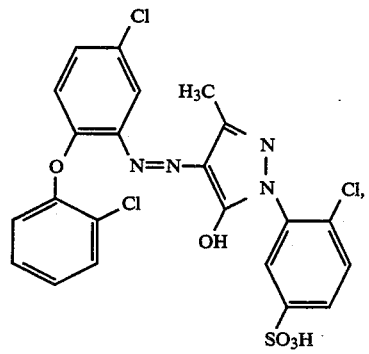
(4)

9. A process according to claim 1, which comprises using a red dye of formula (2), wherein $R_8$ is sulfo or

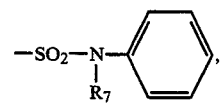

wherein $R_7$ is methyl or ethyl.

10. A process according to claim 1, which comprises using a red dye of formula (2), wherein $R_9$ is sulfo,

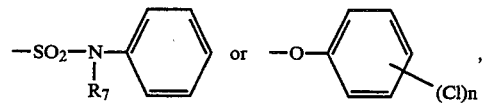

wherein $R_7$ is methyl or ethyl and n is 1.

11. A process according to claim 1, which comprises using a red dye of formula (2), wherein $R_{10}$ is hydrogen or chloromethylcarbonylamino.

12. A process according to claim 1, which comprises using a red dye of formula (2), wherein $R_{11}$ is hydrogen or chloro.

13. A process according to claim 1, which comprises using the red dye of formula

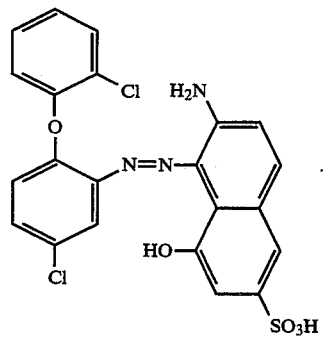
(5)

14. A process according to claim 1, which comprises using a blue dye of formula (3), wherein $R_{14}$ is methyl and $R_{12}$ and $R_{13}$ are hydrogen or methyl.

15. A process according to claim 1, which comprises using a blue dye of formula (3), wherein $R_{15}$ is hydrogen, methyl or —$CH_2$—NH—CO—$CH_2$—Cl.

16. A process according to claim 1, which comprises using a blue dye of formula (3), wherein $R_{16}$ is —$SO_2$—NH—$C_2H_4$—OH, —$CH_2$—NH—CO—$CH_2$—Cl or —$CH_2$—NH—CO—CO—$C_6H_5$.

17. A process according to claim 1, which comprises using the blue dye of formula

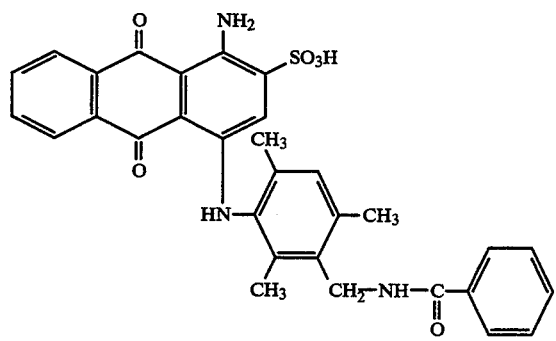
(6)

18. A process according to claim 1, which comprises using at least two dyes having a parachor is from 900 to 1200 and a log P from 1 to 4.

19. A process according to claim 1, which comprises additionally using a black dye of formula

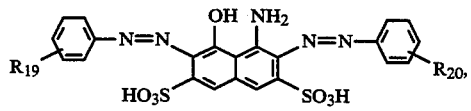
(7)

wherein $R_{19}$ is hydrogen, $C_1$-$C_4$alkyl, $C_1$-$C_4$alkoxy or $C_1$-$C_4$alkanoylamino and $R_{20}$ is chloro or nitro, or a brown dye of formula

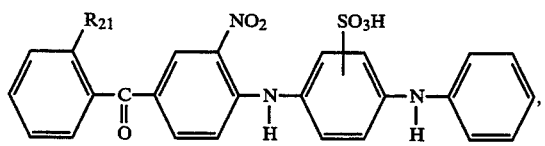
(7a)

wherein $R_{21}$ is —COOH, —CONH$_2$, —SO$_3$H or —SONH$_2$.

20. A process according to claim 1, which comprises additionally using the black dye of formula

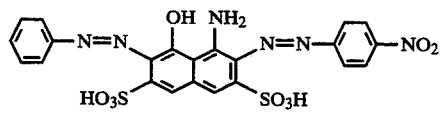
(16)

or the brown dye of formula

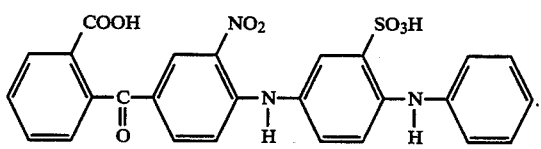
(15)

21. A process according to claim 1, which comprises using a dye liquor which additionally contains a color intensifier.

22. A process according to claim 21, which comprises using a dye liquor which contains an ethoxylated alkylamine as color intensifier.

23. A trichromatic dyeing formulation comprising at least one yellow dye of formula (1), at least one red dye of formula (2) and at least one blue dye of formula (3) according to claim 1.

24. A trichromatic dyeing formulation according to claim 23 comprising 1 to 98% by weight of a yellow dye of formula (1), 1 to 98% by weight of a red dye of formula (2) and 1 to 98% by weight of a blue dye of formula (3).

25. A trichromatic dyeing formulation according to claim 24 comprising 10 to 70% by weight of a yellow dye of formula (1), 10 to 50% by weight of a red dye of formula (2) and 10 to 50% by weight of a blue dye of formula (3).

26. A process of claim 1 wherein the dye mixture consists of a yellow dye of the formula

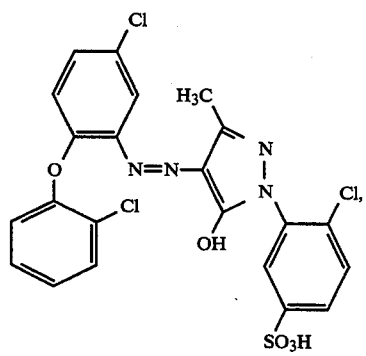
(4)

a red dye of the formula

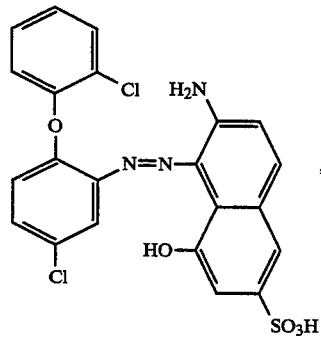
(5)

and a blue dye of the formula

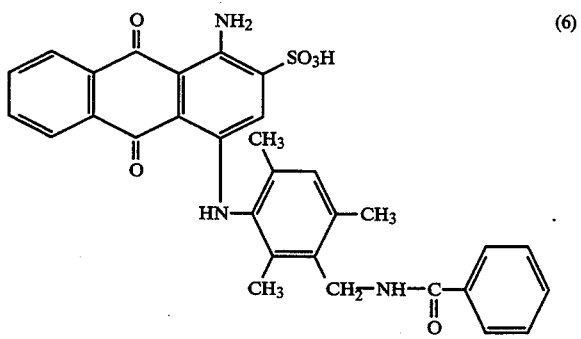
(6)

* * * * *